US010424177B1

(12) United States Patent
Gan et al.

(10) Patent No.: US 10,424,177 B1
(45) Date of Patent: Sep. 24, 2019

(54) RADIO CHANNEL-CHANGE WARNING

(71) Applicant: MOTOROLA SOLUTIONS, INC, Chicago, IL (US)

(72) Inventors: Guo Dong Gan, Kuala Lumpur (MY); Kim Koon Neoh, Bayan Lepas (MY); Grace Wei Wen Lim, Bukit Mertajam (MY); Md Reduan Md Saad, Bukit Mertajam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/226,709

(22) Filed: Dec. 20, 2018

(51) Int. Cl.
G08B 21/00 (2006.01)
G08B 21/02 (2006.01)
H04R 3/00 (2006.01)
G08B 21/18 (2006.01)
G10L 25/51 (2013.01)
G06F 3/16 (2006.01)
H04R 29/00 (2006.01)

(52) U.S. Cl.
CPC ............ G08B 21/02 (2013.01); G06F 3/165 (2013.01); G08B 21/182 (2013.01); G10L 25/51 (2013.01); H04R 3/00 (2013.01); H04R 29/001 (2013.01)

(58) Field of Classification Search
CPC ....... G08B 21/00; G08B 21/182; G06F 3/165; G10L 25/51; H04R 3/00; H04R 29/001
USPC ...................................................... 340/686.3
See application file for complete search history.

(56) References Cited

U.S. PATENT DOCUMENTS

| 7,433,710 | B2 | 10/2008 | Bodnar et al. |
| 7,668,990 | B2 | 2/2010 | Krzyzanowski et al. |
| 7,738,860 | B2 | 6/2010 | Attride et al. |
| 7,912,993 | B2 | 3/2011 | Ziegler |
| 8,135,432 | B2 | 3/2012 | Pinder et al. |
| 8,712,368 | B2* | 4/2014 | Moser ................... H04W 48/18 455/404.1 |
| 8,855,617 | B2 | 10/2014 | Gautier et al. |
| 9,288,660 | B2 | 3/2016 | Puusaari et al. |
| 2003/0115091 | A1 | 6/2003 | Sawyer |
| 2004/0215788 | A1 | 10/2004 | Morris |
| 2005/0282126 | A1 | 12/2005 | Pesso |
| 2006/0015478 | A1 | 1/2006 | Beringer et al. |
| 2006/0262800 | A1* | 11/2006 | Martinez ............... H04W 88/06 370/395.52 |
| 2006/0294350 | A1 | 12/2006 | Yang et al. |
| 2009/0003637 | A1* | 1/2009 | Pansell ................... H04R 25/55 381/314 |
| 2011/0119479 | A1 | 5/2011 | Cowie et al. |
| 2011/0240455 | A1* | 10/2011 | Kulczycki ........... G06F 3/03547 200/600 |

(Continued)

OTHER PUBLICATIONS

Roberts, Joe: Apple's new 'Switch from Android' site says 'life is easier on iPhone', May 23, 2017, http://www.trustedreviews.com/news/apple-s-new-switch-from-android-site-says-life-is-easier-on-iphone, all pages.

(Continued)

Primary Examiner — Kerri L McNally
Assistant Examiner — Thang D Tran

(57) ABSTRACT

A method and apparatus for providing a channel-change warning is provided herein. During operation a radio will alert a user if the user rotates a knob that controls channel/talkgroup in a clockwise manner when the radio is in a noisy environment.

11 Claims, 2 Drawing Sheets

(56) References Cited

U.S. PATENT DOCUMENTS

| | | | |
|---|---|---|---|
| 2011/0281533 A1* | 11/2011 | Deleus | G06F 3/0338 |
| | | | 455/90.2 |
| 2011/0300909 A1* | 12/2011 | Namima | H04M 1/72519 |
| | | | 455/566 |
| 2013/0227225 A1 | 8/2013 | Oliver et al. | |
| 2013/0249814 A1* | 9/2013 | Zeng | G06F 3/0488 |
| | | | 345/173 |
| 2013/0325758 A1 | 12/2013 | Alphin et al. | |
| 2014/0349588 A1* | 11/2014 | Corretjer | H04M 1/72569 |
| | | | 455/73 |
| 2015/0009865 A1* | 1/2015 | Sharma | H04L 5/16 |
| | | | 370/277 |
| 2015/0296351 A1* | 10/2015 | Tham | H04W 4/10 |
| | | | 455/518 |
| 2018/0302948 A1* | 10/2018 | Kotlyarov | G06F 3/0488 |
| 2018/0343024 A1* | 11/2018 | Sahebjavaher | G06F 15/00 |

OTHER PUBLICATIONS

Mac tips for Windows Switcher, published Nov. 28, 2018, https://support.apple.com/en-us/HT204216, downloaded from the internet: Dec. 18, 2018, all pages.

Switch from Mac to Microsoft Surface, https://www.microsoft.com/surface/en-us/support/getting-started/switch-from-mac-to-microsoft-surface?ranMID=24542&ranEAID=TnL5HPStwNw&ranSiteID=TnL5HPStwNw-X_BAk3aNn0Nee4PvVYawvg&tduid=(5ccba07e73f3e254e8413a63d8c06fc3)(256380)(2459594)(TnL5HPStwNw-X_BAk3aNn0Nee4PvVYawvg)( ), last updated Feb. 21, 2018, all pages.

\* cited by examiner

US 10,424,177 B1

RADIO CHANNEL-CHANGE WARNING

BACKGROUND OF THE INVENTION

First responders in stressful or hazardous situations might trigger the wrong user interface (e.g. buttons or knobs). With current devices being voice centric, users in stressful situations might not rely on visual cues and may not be aware of the mistake. This accidental or mistaken use will take time to correct, and might even bring danger to mission critical users.

Consider the Example of a police officer in a dark and noisy place, the police officer turns a knob to turn up the volume on his device, but instead engages the wrong knob and changes the device's channel. As is evident, such a scenario will take time to correct, and might even bring danger to the officer. Therefore, a need exists for a method and apparatus for providing a warning to the officer that a possible error was made when changing the channel.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing a channel-change warning is provided herein. During operation a radio will alert a user if the user rotates a knob that controls channel/talkgroup in a clockwise manner when the radio is in a noisy environment.

Expanding on the above, a radio will continuously monitor the environment and determine how noisy (for example in decibels(dBs)) the environment is. When the radio is within a noisy environment (e.g., above a predetermined threshold, for example 60 dBs) a user may attempt to increase a volume of the radio by turning the volume-control knob clockwise (clockwise when viewed from above). Instead, the user may turn the channel/talkgroup select knob instead. Therefore, when in a noisy environment, any clockwise rotation to the channel/talkgroup-change knob will cause the radio to provide a warning to the user while changing the channel/talkgroup.

In an alternate embodiment of the present invention, the warning is provided to the user only when the user has recently transitioned to the noisy environment. For example, only when the user has transitioned to a noisy environment within the last 5 seconds.

In one embodiment the warning comprises a visual warning on a display. For example, the display may flash a warning "TALKGROUP BEING CHANGED". In another embodiment, an audible warning is provided, for example, a tone may be played from a speaker on the radio. In yet another embodiment, a haptic feedback to the knob may provide the warning. More particularly, the knob may provide a vibration to the user as part of the warning as described in US2015/0199012, entitled METHOD AND APPARATUS FOR PROVIDING A HAPTIC FEEDBACK TO A ROTARY KNOB.

Figure 1:
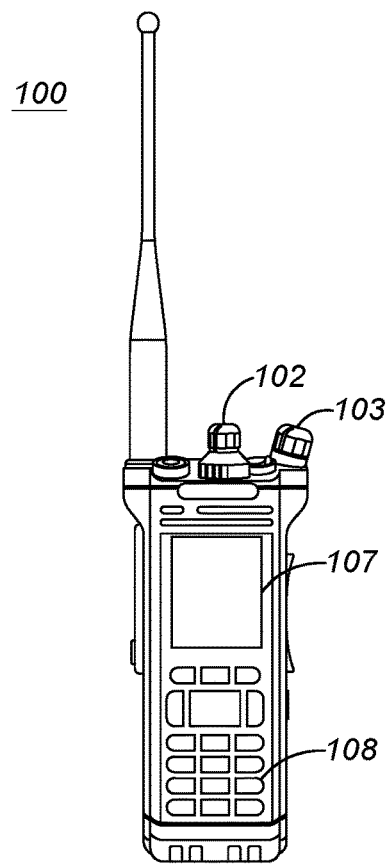
FIG. 1 illustrates a radio having multiple knobs.

FIG. 1 illustrates device 100 having multiple rotary knobs 102 and 103. As shown, device 100 also comprises graphical user interface (GUI) 107 and speaker/microphone 108. In a preferred embodiment, GUI 107 comprises a man-machine interface such as a touch-screen. Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Rotary knobs 102 and 103 allow the user to directly manipulate functions and settings of device 100. Knobs 102 and 103 are approximately cylindrical, however alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

During operation, a user preferably grips or contacts the circumferential surface of knob 102 and rotates it a desired amount to activate various functions. A first knob 102/103 controls a volume of speaker 108.

A second knob 102/103 controls a channel/talkgroup of device 100. More particularly, in a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A knob 102/103 is provided, the rotation of which switches between channels/talkgroups.

Figure 2:
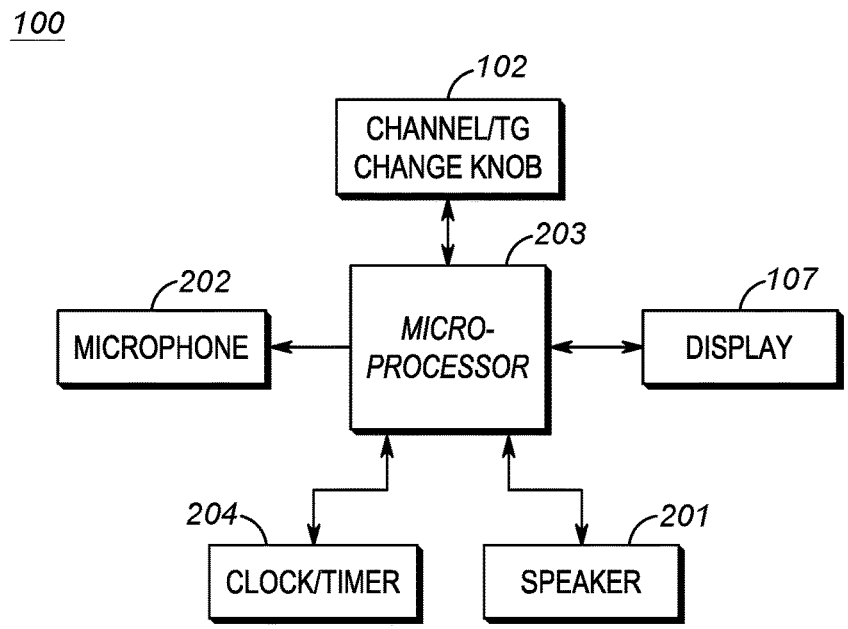
FIG. 2 is a block diagram of the radio of FIG. 1.

FIG. 2 is a more-detailed block diagram of the radio of FIG. 1. As shown, radio 100 comprises display 107, knob 102 (only one of two knobs are shown in FIG. 2), microprocessor (logic circuitry) 203, and speaker 201.

Logic circuitry 203 comprises a digital signal processor (DSP), general purpose microprocessor, a programmable logic device, or application specific integrated circuit (ASIC) and is utilized to provide the functionality described below.

Knob 102 includes an internal sensor (not shown) as knobn in the art to provide position and rotational direction information (clockwise/counter clockwise) to logic circuitry 203 to communicate knob position for selection of channels/talkgroups. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc.

Microphone 202 converts sound waves to electrical signals, and provides the signals to processor 203.

Display 107 provides a man/machine interface for receiving an input from a user and displaying information. For example, display 107 may provide a way of conveying (e.g., displaying) information received from processor 203. Part of this information may comprise a warning that a channel/talkgroup has been changed. In order to provide the above features (and additional features), display 107 may comprise any combination of a touch screen, a computer screen, or any other interface to provide information to the user.

Speaker 201 converts electrical signals provided to it from logic circuitry 203 into an audible output. The audible output may be a warning to a user that a channel/talkgroup change has occurred.

During operation, knob 102 outputs an angle of rotation to logic circuitry 203. from the angle of rotation, logic circuitry 203 can infer if knob 102 has been rotated in a clockwise fashion.

Microphone 202 continuously monitors the audible environment and provides this information to logic circuitry 203. From this information, microprocessor 203 can infer how noisy the environment is, and additionally, if any transition was made from a non-noisy to a noisy environment.

In a first embodiment of the present invention, when logic circuitry 203 determines that a noisy environment exists, and when knob 102 has been rotated in a clockwise fashion, logic circuitry causes a warning to be issued to the user that a channel change has occurred. As discussed above, the warning may comprise an audible warning output to speaker 201, a visual warning output to display 107, or a combination of both.

In a second embodiment of the present invention, when logic circuitry 203 determines that a transition to a noisy environment has been made, and when knob 102 has been rotated in a clockwise fashion, logic circuitry causes a warning to be issued to the user that a channel change has occurred. As discussed above, the warning may comprise an audible warning output to speaker 201, a visual warning output to display 107, or a combination of both. It should be noted that a "transition" to a noisy environment encompasses radio 100 moving from a non-noisy environment (noise below a threshold) to a noisy environment (noise above a threshold) within a predetermined period of time (e.g., the last 5 seconds).

In the second embodiment of the present invention, clock, or timer 204 is provided. When a transition is detected to a noisy environment, logic circuitry 203 will access timer to determine how long it has been since the transition was made to the noisy environment. Warnings will only be provided if a clockwise motion has been detected on the channel/talkgroup selection knob within a predetermined time period of transitioning to the noisy environment (e.g., 10 seconds).

The apparatus 100, shown in FIG. 1 and FIG. 2 comprises a microphone configured to detect noise, a volume-control knob, a talkgroup/channel selection knob, a speaker, and logic circuitry. The logic circuitry is configured to detect when the noise is above a threshold, and also detect when the talkgroup/channel selection knob is rotated in a clockwise fashion and warn the user that the talkgroup/channel selection knob is rotated when the noise is above the threshold and the talkgroup/channel selection knob is rotated in a clockwise fashion.

As discussed above, a graphical-user interface may be provided, and the warning may comprise a message on the graphical-user interface. Alternatively, the warning may comprise an audible warning on the speaker.

The logic circuitry can also be configured to determine that a recent transition occurred from a non-noisy to a noisy environment, and wherein the warning is provided to the user only when the recent transition has occurred. When this is the situation, the apparatus 100 shown in FIG. 1 and FIG. 2 comprises a microphone configured to detect noise, a volume-control knob, a talkgroup/channel selection knob, a speaker, a timer, a graphical-user interface, and logic circuitry. The logic circuitry is configured to access the microphone to detect when the noise is above a threshold, access the talkgroup/channel selection knob to detect when the talkgroup/channel selection knob is rotated in a clockwise fashion, access the timer to determine a time period since the noise transitioned above the threshold, and warn the user that the talkgroup/channel selection knob is rotated when the noise is above the threshold and the time period is below a threshold, and the talkgroup/channel selection knob is rotated in a clockwise fashion.

Figure 3:
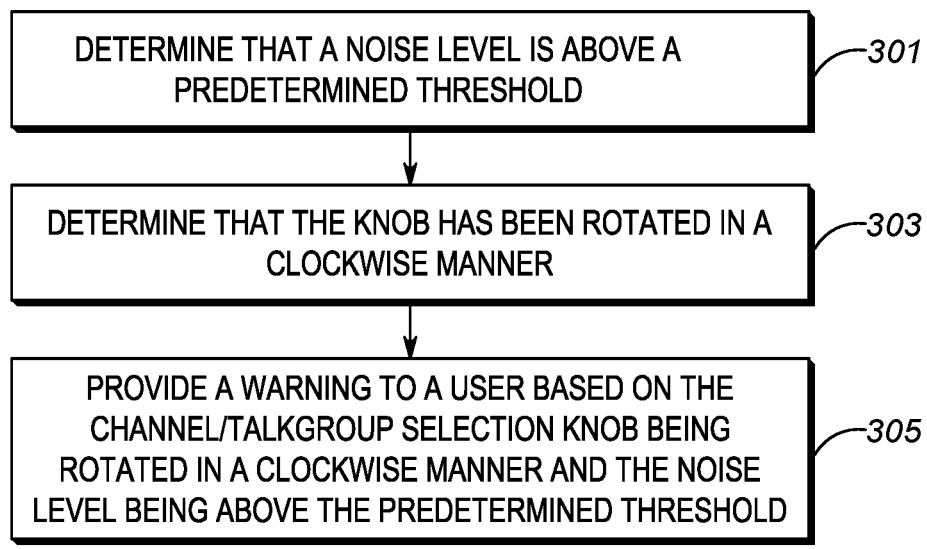
FIG. 3 is a flow chart showing operation of device of FIG. 1

FIG. 3 is a flow chart showing operation of device 100. The logic flow begins at step 301 where logic circuitry 203 accesses microphone 202 and determines that a noise level is above a predetermined threshold. At step 303 logic circuitry 203 accesses channel/talkgroup selection knob 102 and determines that the knob has been rotated in a clockwise manner. At step 305, logic circuitry 203 provides a warning to a user based on the channel/talkgroup selection knob being rotated in a clockwise manner and the noise level being above the predetermined threshold.

As discussed above, the warning comprises a message on graphical-user interface (display) 107, or the warning may comprise an audible warning output from logic circuitry 203 to speaker 201.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The term "one of" when applied herein to two or more subsequently defined options such as "one of A and B" should be construed to mean any combination of any one of the options in the list alone (e.g., A alone or B alone) or any combination of two or more of the options, or all of the options, in the list together (e.g., A and B together).'

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for providing a channel/talkgroup change warning, the apparatus comprising: a microphone configured to detect noise; a volume-control knob; a talkgroup/channel selection knob; a speaker; and logic circuitry configured to detect when the noise is above a threshold, and also detect when the talkgroup/channel selection knob is rotated in a clockwise fashion and warn a user that the talkgroup/channel selection knob is rotated when the noise is above the threshold and the talkgroup/channel selection knob is rotated in the clockwise fashion.

2. The apparatus of claim 1 further comprising:
   a graphical-user interface; and
   wherein the warning comprises a message on the graphical-user interface.

3. The apparatus of claim 1 wherein the warning comprises an audible warning on the speaker.

4. The apparatus of claim 1 wherein the logic circuitry is also configured to:
   determine that a recent transition occurred from a non-noisy to a noisy environment, and wherein the warning is provided to the user only when the recent transition has occurred.

5. An apparatus for providing a channel/talkgroup change warning, the apparatus comprising: a microphone configured to detect noise; a volume-control knob; a talkgroup/channel selection knob; a speaker; a timer; a graphical-user interface; and logic circuitry configured to access the microphone to detect when the noise is above a threshold, access the talkgroup/channel selection knob to detect when the talkgroup/channel selection knob is rotated in a clockwise fashion, access the timer to determine a time period since the noise transitioned above the threshold, and warn a user that the talkgroup/channel selection knob is rotated when the noise is above the threshold and the time period is below a threshold, and the talkgroup/channel selection knob is rotated in the clockwise fashion.

6. The apparatus of claim 5 further comprising:
a graphical-user interface; and
wherein the warning comprises a message on the graphical-user interface.

7. The apparatus of claim 5 wherein the warning comprises an audible warning on the speaker.

8. A method comprising the steps of: determining a noise level is above a predetermined threshold; determining that a channel/talkgroup selection knob has been rotated in a clockwise manner; and providing a warning to a user based on the channel/talkgroup selection knob being rotated in the clockwise manner and the noise level being above the predetermined threshold.

9. The method of claim 8 wherein the warning comprises a message on a graphical-user interface.

10. The method of claim 8 wherein the warning comprises an audible warning.

11. The method of claim 8 further comprising the step of:
determining that a recent transition occurred from a non-noisy to a noisy environment, and wherein the warning is provided to the user only when the recent transition has occurred.

\* \* \* \* \*